(12) United States Patent
Weigl et al.

(10) Patent No.: US 6,650,224 B1
(45) Date of Patent: Nov. 18, 2003

(54) AUTHORIZATION VERIFICATION SYSTEM FOR VEHICLES

(75) Inventors: Andreas Weigl, Linkenheim-Hochstetten (DE); Karl-Ernst Weiss, Ettlingen (DE); Stephan Schmitz, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/646,542
(22) PCT Filed: Mar. 15, 1999
(86) PCT No.: PCT/DE99/00701
§ 371 (c)(1), (2), (4) Date: Nov. 22, 2000
(87) PCT Pub. No.: WO99/47393
PCT Pub. Date: Sep. 23, 1999

(30) Foreign Application Priority Data

Mar. 17, 1998 (DE) .......................................... 198 11 435

(51) Int. Cl.⁷ .......................... G05B 23/00; G06F 7/04; H04B 1/38; H04Q 1/00
(52) U.S. Cl. ...................... 340/5.61; 340/5.6; 340/5.62; 340/825.69; 340/5.63
(58) Field of Search ................................ 340/5.61, 5.6, 340/5.72, 825.69, 5.24, 5.63, 5.62, 5.31, 825.22, 10.51, 10.1; 307/10.5, 10.1, 10.3

(56) References Cited

U.S. PATENT DOCUMENTS

| | | | |
|---|---|---|---|
| 4,754,255 A | | 6/1988 | Sanders et al. |
| 5,508,691 A | | 4/1996 | Castleman et al. |
| 5,880,679 A | * | 3/1999 | Lenart et al. .......... 340/825.31 |
| 5,912,512 A | * | 6/1999 | Hayashi et al. ............ 307/10.5 |
| 6,184,779 B1 | * | 2/2001 | Chen ........................ 340/425.5 |
| 6,191,701 B1 | * | 2/2001 | Bruwer .................... 340/825.3 |
| 6,346,877 B1 | * | 2/2002 | Flick ......................... 340/426 |

FOREIGN PATENT DOCUMENTS

| | | |
|---|---|---|
| EP | 0 704 352 | 4/1996 |
| WO | WO 93 23270 | 11/1993 |

* cited by examiner

*Primary Examiner*—Michael Horabik
*Assistant Examiner*—Vernal Brown
(74) *Attorney, Agent, or Firm*—Kenyon & Kenyon

(57) ABSTRACT

An authorization checking system for motor vehicles, in which a control unit in the motor vehicle, having a portable user-transponder, in an inquiry-response dialog using data exchange, checks, and allows or blocks, the authorization for unlocking or locking the vehicle doors as well as for starting or driving. In order to be able to modify the identifiers of user-transponders and components of the motor vehicle in a security-relevant manner, a so-called master-transponder is provided in addition to one or a plurality of user-transponders. The master-transponder has a particular, vehicle-specific identifier, using which, in a special-inquiry-response dialog, the authorization to carry out and complete special functions within a preselected scope, going beyond the access and start/drive authorization, can be checked, and allowed or blocked. For carrying out the special functions, the master-transponder has acoustical and/or optical display devices and/or input devices.

14 Claims, 1 Drawing Sheet

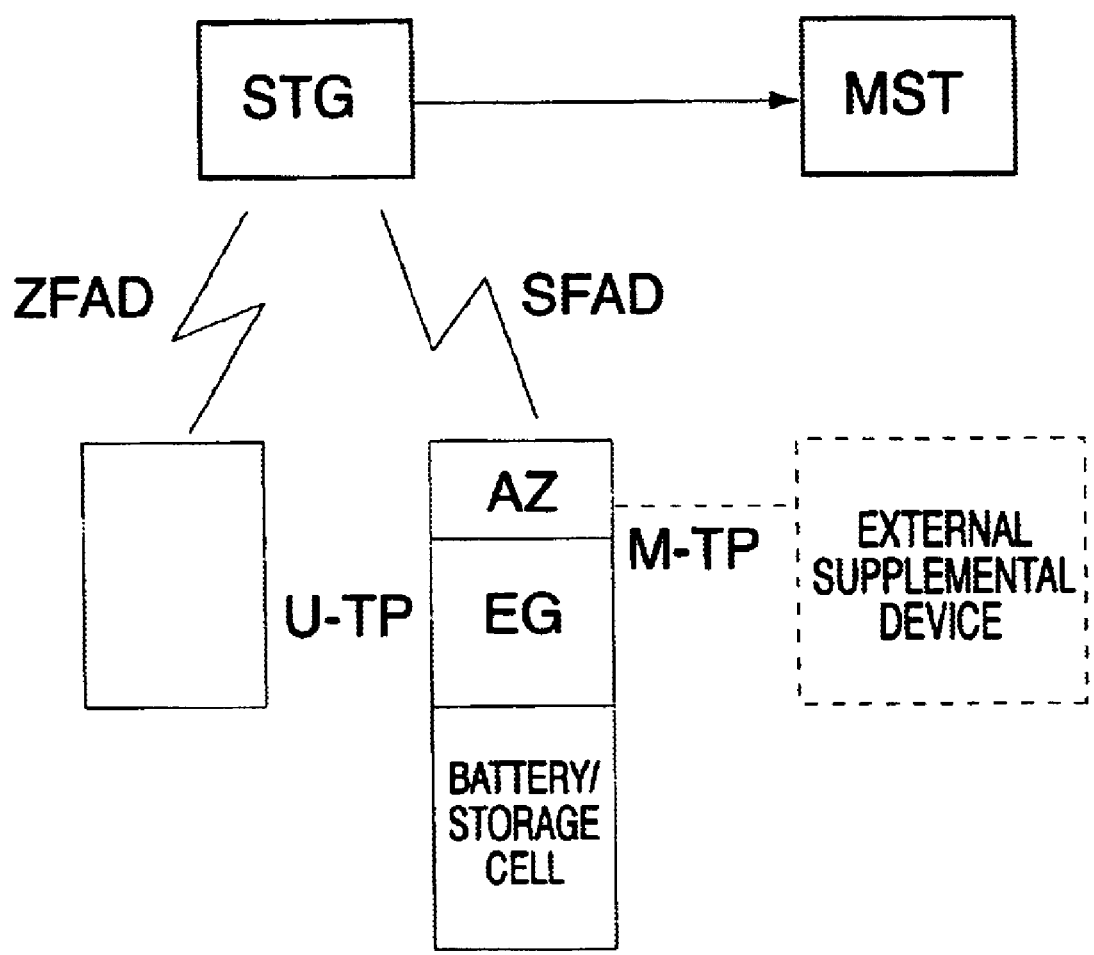

AUTHORIZATION VERIFICATION SYSTEM FOR VEHICLES

FIELD OF THE INVENTION

The present invention relates to an authorization checking system for motor vehicles, in which a control unit in the motor vehicle having one or a plurality of user-transponders, in an inquiry/response dialog using identifiers in accord with each other, checks, and allows or blocks, the authorization for unlocking and locking the motor vehicle doors as well as for starting and driving the motor vehicle, and using a master-transponder, in a special-inquiry-response dialog, differing therefrom, checks, and allows or blocks, the authorization for carrying out special functions.

BACKGROUND INFORMATION

An authorization checking system operating for motor vehicles, that employs user-transponders and one special master-transponder, is described in European Published patent application Ser. No. 0 835 790. Authorization checking systems of this type are advantageously used as theft protection systems in motor vehicles, having access to, starting, and driving the motor vehicle only being granted to the user having a vehicle-specific user-transponder. In authorization checking systems of this type it is desirable, after loss or theft of a user-transponder, to provide for the possibility of erasing (the data from) user-transponders of this type, adapted to the vehicle as a result of a programming procedure, and of programming new and/or other available user-transponders. In this context, the master-transponder functions to reprogram the identifier for the user-transponder. However, a data exchange between master-transponder and control unit for carrying out expanded special functions is not possible.

SUMMARY OF THE INVENTION

It is an object of the present invention, in an authorization checking system of this type used as an access and start/drive authorization system, that the user (be able to) carry out further special functions in a simple manner using the master-transponder.

Since, in the event of the replacement of defective vehicle components, the loss of a user-transponder, the programming of a new user-transponder, or the modification and/or addition of a special program, an authorized service station is not always available, the user of the motor vehicle, if he is in possession of the master-transponder, can undertake these procedures himself. Since the user cannot start and drive the motor vehicle using the master-transponder, the latter can be kept separate from the motor vehicle in a theft-proof place and can be used only when necessary.

Furthermore, since all operationally relevant electronic control units of a motor vehicle, furnished with a corresponding connection for the exchange of data, and the vehicle-specific master-transponder receive a common code at the end of the assembly line and, in a suitable system design, receive their mutual identification marks, e.g., serial numbers, it is not sufficient in the case of stolen vehicles to replace only one single control unit. For this purpose, replacement components are programmed to the remaining original vehicle electronic system, in connection with the vehicle-specific master-transponder.

Further special functions, easily realizable through the use of a master-transponder designed in accordance with the present invention, are the programming of function limitations of a vehicle, for example, a maximum permitted driving distance or limited usefulness of equipment objects connected to this system, such as a mobile telephone, as well as, particularly in the case of leased motor vehicles, the reading out of relevant vehicle data. This data can be the actual driving distance, the date and time, defects as well as data in the form of an electronic trip recorder.

For noncommercial vehicle owners, an electronic trip log book can be maintained in the same manner, providing information on fuel usage, kilometers driven, or defects arising during the trip.

For all of these special functions, protection against unauthorized access is desirable, thus presupposing the master-specific special-inquiry-response dialog.

BRIEF DESCRIPTION OF THE DRAWING

The figure illustrates a block diagram of the present invention.

DETAILED DESCRIPTION

In the block diagram, STG designates a control unit, accommodated in the motor vehicle, having transmitting and receiving devices for data exchange with a user-transponder U-TP and a master-transponder M-TP. The data exchange, in accordance with the related art, can take place in a wireless or contactless manner. Control device STG, in accordance with safety requirements, is connected to other operationally relevant components, here by way of example to engine control unit MST, such that all of these components can be placed in operation only if authorization is present. All of the devices for data exchange, such as antennas, etc., are not depicted separately and belong functionally to control unit STG.

Using user-transponder U-TP, access to a motor vehicle, i.e., the locking and unlocking of the vehicle doors, can be controlled, just as, if necessary, the authorization to start and drive the motor vehicle can be. After the inquiry of the identification mark of a transponder is triggered by control unit STG, e.g., after pulling an external door handle, in using an inquiry-response dialog ZFAD, for example, control unit STG transmits an inquiry signal to user-transponder U-TP or master-transponder M-TP. If the queried transponder responds using the correct response signal, the locking or unlocking of the vehicle doors is carried out or, upon checking the driving authorization, the permission to start the vehicle engine and to further use the vehicle is provided or, in the event of a false or missing transponder response, is denied.

In one specific special-inquiry-response dialog SFAD, vehicle control unit STG communicates only with master-transponder M-TP. Individual identifiers of user-transponder U-TP and master-transponder M-TP designate the respective dialog and the scope of functions. The switchover from normal access-inquiry-response dialog ZFAD to special-inquiry-response dialog SFAD proceeds through recognition of the specific identifier of a master-transponder M-TP belonging to the system. This master-transponder M-TP, in particular, has special authorizations for carrying out security-related functions, which go beyond normal vehicle use. Special functions of this type are, above all, programming and/or erasing data from user-transponders and/or programming replaced vehicle components, such as the engine control unit, transmission, etc.

Master-transponder M-TP authorizes only access, but it does not provide authorization for starting or driving. As a result, on the one hand, the legal vehicle owner is to be hindered from carrying the master-transponder with him for normal vehicle operation, and on the other hand, security-critical procedures, such as programming without service station devices, require access to the vehicle interior.

Since master-transponder M-TP permits these security-related procedures, it is a unique copy, programmed along with the entire vehicle at the end of the assembly line manufacturing process.

In contrast, user-transponders U-TP, in larger numbers both on the assembly-line and as well as later in a service station, can be programmed and/or erased using a corresponding device and/or, in accordance with the appropriate system design, by the vehicle and master-transponder owner directly in the vehicle. In principle, the initiation of the corresponding procedures requires the presence of master-transponder M-TP, irrespective of whether the programming and/or the erasing is to be performed using a service station device, e.g., a tester, or only using the available vehicle devices.

In order to avoid greater equipment expense in the vehicle and to make possible servicing without a visit to a service station, the present invention provides that all devices for carrying out the procedures, such as scanners, switches, displays, etc., be furnished on or in master-transponder M-TP. As a result, advantages are achieved with respect to space requirements for devices in the vehicle that are only seldom required, as well as with regard to increased theft protection as a result of placing the components for the special functions (keyboard, menu, etc.) in the specially marked and unique master-transponder M-TP. No re-programming using a different master-transponder M-TP, also furnished with input device EG and/or display device AZ, is possible due to the vehicle-specific secret identifier that would then be missing, not even if an external supplemental device were used. The latter, in a correspondingly designed system, also requires the vehicle-specific master-transponder M-TP as identifier generator with respect to the vehicle, i.e., it can only provide the display and/or input device as well as the data connection to the motor vehicle.

The user of master-transponder M-TP can be guided both optically (display) as well as acoustically (speech production), in order to be able to carry out selectable special functions. Master-transponder M-TP is then advantageously provided with an acoustical and/or an optical display device AZ and/or with an input device EG. Display device AZ can be a speaker, an alphanumeric display, or even a simple light-emitting diode having a blink code, and input device EG can be a keyboard having any number of keys. Both devices are also possible separately. The use of a display of any kind already present in the motor vehicle is also possible on the basis of a keyboard on or in master-transponder M-TP, or, vice versa, the use of a keyboard present in the vehicle, such as of a mobile telephone, is also possible on the basis of a display device in master-transponder M-TP.

If master-transponder M-TP contains an information or display device AZ, then this can also be used for other purposes, e.g., as an "electronic vehicle registration document," as a registration device for service intervals or as documentation with respect to as to when respective user-transponders U-TP were programmed. Thus insurance fraud on the basis of pretended theft is made more difficult.

The power supply and the data exchange can be carried out both over a connecting line as well as in a wireless fashion, e.g., inductively. In the latter case, it is particularly advantageous if master-transponder M-TP can be inserted into an already available write/read unit, such as of a car radio or mobile telephone. Other kinds of power supply and/or data transmission can obviously also be used. Thus master-transponder M-TP can also contain its own energy source in the form of a battery or accumulator (storage cell).

It is particularly advantageous if a recording device is installed in the vehicle interior for user-transponder U-TP, which, particularly for programming but also for selective erasing from the vehicle data memory in control unit STG, is placed into the recording device. In this manner, it is always assured that only one user-transponder U-TP is programmed and/or erased, in contrast to systems having communication between the vehicle and a transponder located somewhere in the interior of the vehicle (so-called "hands-free" systems).

The advantage of the separation into master-transponder M-TP and user-transponder U-TP lies in the fact that the user does not need to carry any numerical code (PIN), and the only one who can undertake modifications in the vehicle (replace electronic components) and/or in the access rights, is the one who is in possession of vehicle-specific master-transponder M-TP. The use of an external supplemental device by itself is not sufficient for this purpose.

What is claimed is:

1. An authorization checking system for a motor vehicle, comprising:

at least one user-transponder;

a control unit in the motor vehicle that, in accordance with an operation of the at least one user-transponder in a first inquiry-response dialog having identifiers in accordance with each other, checks and performs one of an allowance and a blocking with respect to an authorization for unlocking and locking vehicle doors and with respect to a starting and a driving of the motor vehicle; and a master-transponder, according to an operation of which the control unit, in a special-inquiry-response dialog differing from the first inquiry-response dialog, checks and performs one of an allowance and a blocking with respect to a performance of special functions, and according to the operation of which the control unit provides only access to the motor vehicle but not the authorization for the starting and the driving of the motor vehicle, wherein:

the master-transponder, in order to perform further special functions, includes an input device and a display device, and the special functions include:

performing at least one of a programming of a new one of the at least one user-transponder and, an erasing of an already programmed one of the at least one user-transponder, programming at least one of replaced vehicle control units and electronic vehicle components connected to a protective system, and programming use limitations of at least one of the motor vehicle and equipment components, and reading out vehicle data.

2. The authorization checking system of claim 1, wherein, in accordance with the operation of the master-transponder, security-related vehicle special functions are at least one of programmed and blocked.

3. The authorization checking system of claim 1, wherein, in accordance with the operation of the master-transponder, the special-inquiry-response dialog and vehicle-specific core data for the at least one user-transponder are at least one of programmed and blocked.

4. The authorization checking system of claim 1, further comprising:
an external supplemental device in connection only with the master-transponder and for performing at least one of an erasing and a programming of programming procedures.

5. The authorization checking system of claim 1, wherein at least one of the erasing, programming and data selection procedures are guided by at least one of optical and acoustical directions.

6. The authorization checking system of claim 1, wherein the master-transponder is supplied with power according to one of an inductive process and an electrical connection from the vehicle.

7. The authorization checking system of claim 1, wherein the master-transponder includes one of a battery and a storage cell.

8. The authorization checking system of claim 1, wherein once access is granted via the master-transponder, vehicle devices are automatically switched over to a special operation.

9. The authorization checking system of claim 1, wherein the master-transponder one of modifies and limits functions of vehicle devices.

10. The authorization checking system of claim 1, wherein the master-transponder reads out and feeds to an evaluation unit outside the motor vehicle at least one of the vehicle data and use data.

11. The authorization checking system of claim 1, wherein to carry out the special functions, the master-transponder functions as an identification device and as a display, and the input of one of data and commands occurs using input devices of equipment units arranged in the motor vehicle.

12. The authorization checking system of claim 1, wherein to carry out special functions, the master-transponder functions as an identification device and as a display, and the input of one of data and commands occurs using a car radio arranged in the motor vehicle.

13. The authorization checking system of claim 1, wherein to carry out special functions, the master-transponder functions as an identification device and to input one of data and commands, and a display of procedures and a guiding of a user occur using output devices of equipment units in the motor vehicle.

14. The authorization checking system of claim 1, wherein to carry out special functions, the master-transponder functions as an identification device and to input one of data and commands, and a display of procedures and a guiding of a user occur using a car radio arranged in the motor vehicle.

* * * * *